(12) United States Patent
Ceribelli et al.

(10) Patent No.: US 9,679,490 B2
(45) Date of Patent: Jun. 13, 2017

(54) OPPORTUNISTIC UNMANNED AUTONOMOUS VEHICLE ENERGY HARVESTING

(71) Applicant: QUALCOMM Incorporated, San Diego, CA (US)

(72) Inventors: Marcelo Ceribelli, San Diego, CA (US); Benjamin Lund, Escondido, CA (US); Lael Pearce, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 14/817,346

(22) Filed: Aug. 4, 2015

(65) Prior Publication Data

US 2017/0039861 A1 Feb. 9, 2017

(51) Int. Cl.
*G06F 19/00* (2011.01)
*G08G 5/00* (2006.01)
*G05D 1/00* (2006.01)

(52) U.S. Cl.
CPC ......... *G08G 5/0069* (2013.01); *G05D 1/0005* (2013.01)

(58) Field of Classification Search
USPC ...................... 701/1, 26; 414/392; 29/402.08
See application file for complete search history.

(56) References Cited

U.S. PATENT DOCUMENTS

| | | | |
|---|---|---|---|
| 8,511,606 B1 * | 8/2013 | Lutke | B64C 39/028 244/100 R |
| 8,899,903 B1 * | 12/2014 | Saad | B65G 67/00 320/109 |
| 8,954,206 B2 | 2/2015 | Criado | |
| 2009/0230686 A1 * | 9/2009 | Catlin | F03B 13/264 290/54 |
| 2013/0081245 A1 * | 4/2013 | Vavrina | B60L 11/1822 29/402.08 |
| 2014/0103158 A1 | 4/2014 | Berry | |
| 2015/0097071 A1 | 4/2015 | Frolov et al. | |
| 2015/0120094 A1 | 4/2015 | Kimchi et al. | |
| 2016/0046387 A1 * | 2/2016 | Frolov | G08G 5/0069 244/59 |

(Continued)

FOREIGN PATENT DOCUMENTS

| | | |
|---|---|---|
| CN | 104044741 A | 9/2014 |
| WO | 2014020596 A1 | 2/2014 |

*Primary Examiner* — Ronnie Mancho
(74) *Attorney, Agent, or Firm* — The Marbury Law Group, PLLC

(57) ABSTRACT

Methods, devices, and systems of various embodiments are disclosed for exploiting opportunistic energy harvesting conditions for an unmanned autonomous vehicle (UAV). Various embodiments include determining mission power parameters for the UAV and accessing energy-harvesting data. A suitability of an energy-harvesting site for stationary energy harvesting by the UAV may be assessed based on the mission power parameters and the energy-harvesting data. In addition, an initial course of the UAV may be adjusted based on the assessment of the suitability of the energy-harvesting site. Stationary energy harvesting may include a process performed by the UAV that derives energy by conversion from an external power source while in a fixed position and/or in contact with an adjacent object.

30 Claims, 8 Drawing Sheets

(56) References Cited

U.S. PATENT DOCUMENTS

2016/0050011 A1* 2/2016 Frolov .............. H04B 7/18506
 455/431
2016/0156406 A1* 6/2016 Frolov ................ H04W 16/28
 455/431
2016/0313744 A1* 10/2016 Amelio ................. B64C 27/08

* cited by examiner

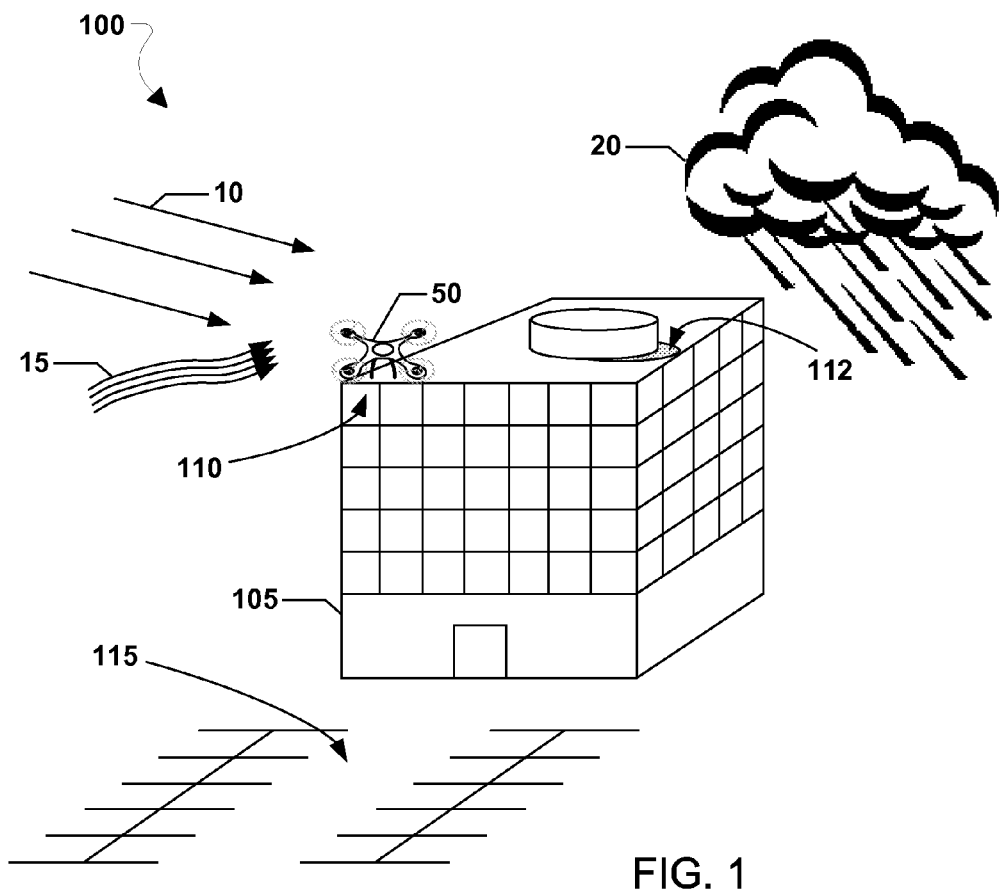
FIG. 1
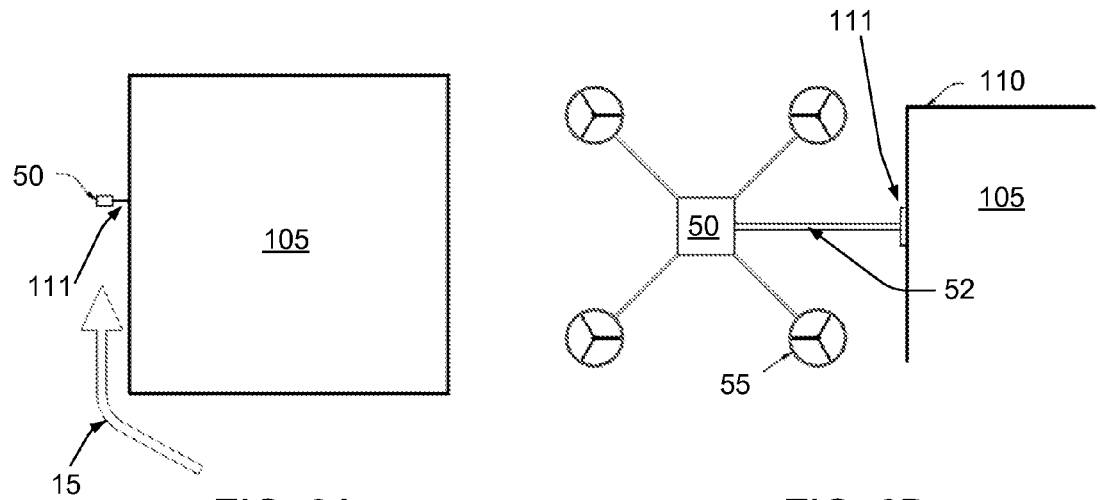
FIG. 2A
FIG. 2B

OPPORTUNISTIC UNMANNED AUTONOMOUS VEHICLE ENERGY HARVESTING

BACKGROUND

Unmanned autonomous vehicles (UAVs) have a maximum travel range due to a finite supply of onboard power. While refueling stations (e.g., charging stations) may be provided to extend the travel range of the UAV, such refueling stations may not be readily available for all parts of a long-range course. In addition, reaching the refueling stations may take too long, causing the UAV to be late in reaching its destination. Although onboard energy harvesting systems (e.g., solar cells) may be provided, propulsion systems generally consume energy much faster than can be harvested. In addition, inclement weather en-route to a destination may prevent onboard energy harvesting systems from harvesting enough energy to complete a course.

SUMMARY

Methods, devices, and systems of various embodiments are disclosed for exploiting opportunistic energy harvesting conditions for a UAV. Various embodiments include determining mission power parameters for the UAV and accessing energy-harvesting data. A suitability of an energy-harvesting site for stationary energy harvesting by the UAV may be assessed based on the mission power parameters and the energy-harvesting data. In addition, an initial course of the UAV may be adjusted based on the assessment of the suitability of the energy-harvesting site. Stationary energy harvesting may include a process performed by the UAV that derives energy by conversion from an external power source while in a fixed position and/or in contact with an adjacent object. For example, the external power source may include wind energy and/or solar power.

In various embodiments, assessing the suitability of the energy-harvesting site may include determining whether the energy-harvesting data indicates that the energy-harvesting site meets an energy production threshold suitable for the UAV to achieve the mission power parameters. An energy production threshold may be defined by an amount of energy production over a period, a rate of energy production, or a set amount of energy production. Assessing the suitability of the energy-harvesting site may also include determining whether an energy harvesting potential of the energy-harvesting site, offset by an energy expenditure associated with completing a course deviation to the energy-harvesting site, is suitable for the UAV to achieve the mission power parameters. In addition, the suitability of the energy-harvesting site may be assessed by determining whether an amount of time needed to reach and/or harvest energy at the energy-harvesting site meets mission temporal parameters. Further, assessing the suitability of the energy-harvesting site for stationary energy harvesting by the UAV may include determining from the energy-harvesting data at least one environmental characteristic of the energy-harvesting site selected from a group consisting of a sunlight level, a sunlight duration, a shade movement pattern, a wind level, a wind duration, a precipitation level, a precipitation duration, and a level of shelter from hostile environments. Such environmental characteristics may be current and/or predictive values. Further, assessing the suitability of the energy-harvesting site for stationary energy harvesting by the UAV may include determining a level of at least one site risk selected from a group consisting of a disturbance likelihood, an ability of the UAV to remain stable at the energy-harvesting site, an availability of reliable fixation elements at the energy-harvesting site, an irretrievability of the UAV from the energy-harvesting site, and a success rate of prior UAV visits to the energy-harvesting site. The assessment of the suitability of the energy-harvesting site for stationary energy harvesting by the UAV may additionally include real-time data related to the energy-harvesting site obtained by the sensor, analyzing information from a prior UAV visit to one or more sites, and/or determining whether at least one other UAV is currently located at the energy-harvesting site.

In various embodiments, the energy-harvesting site may be selected from a plurality of energy-harvesting sites, wherein adjusting the initial course of the UAV includes adjusting a travel plan of the UAV to travel to the energy harvesting site selected. In addition, the UAV may park at the energy-harvesting site selected for stationary energy harvesting prior to reaching a destination of the initial course of the UAV. Also, at least one of a position and an orientation of the UAV may be changed after performing energy harvesting at the energy-harvesting site while remaining at the energy harvesting site. In addition, a component configuration of the UAV may be changed for stabilizing the UAV during stationary energy harvesting at the energy-harvesting site. Similarly, a grappling component controlled by the processor may be activated for securing the UAV to an object located at the energy-harvesting site.

In various embodiments, a parameter update to the mission power parameters for the UAV may be accessed for reassessing the suitability of the energy-harvesting site for stationary energy harvesting by the UAV based on the update to the mission power parameters. In addition, a sensor may be activated for generating an energy-harvesting update in response to reaching the energy-harvesting site for reassessing the suitability of the energy-harvesting site for stationary energy harvesting by the UAV based on the energy-harvesting update. Further, an energy-harvesting update to the energy-harvesting data may be accessed for reassessing the suitability of the energy-harvesting site for stationary energy harvesting by the UAV based on the energy-harvesting update. A determination may be made whether an available onboard power level meets the mission power parameters. The mission power parameters may indicate a projected power requirement and a power reserve threshold for a mission. Accessing the energy-harvesting data may be performed in response to determining that the available onboard power level does not meet the mission power parameters. Also, determining mission power parameters may include determining whether stationary energy harvesting is not permissible due to a perishable nature of a payload or the payload has too high a value.

Further embodiments include a UAV having a processor configured to execute operations of the methods described above.

Further embodiments include a UAV having means for performing functions of the method operations described above.

Further embodiments include a non-transitory processor-readable storage medium having stored thereon processor-executable instructions configured to cause a processor to perform operations of the above-discussed method operations.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 1 is a schematic diagram of a UAV at a site for stationary energy harvesting according to various embodiments.

FIG. 2A is a top view of a UAV fixed to the side of a building at a site for stationary energy harvesting according to various embodiments.

FIG. 2B is a side elevation relief view of the UAV fixed to the side of the building in FIG. 2A according to various embodiments.

DETAILED DESCRIPTION

Figure 3A:
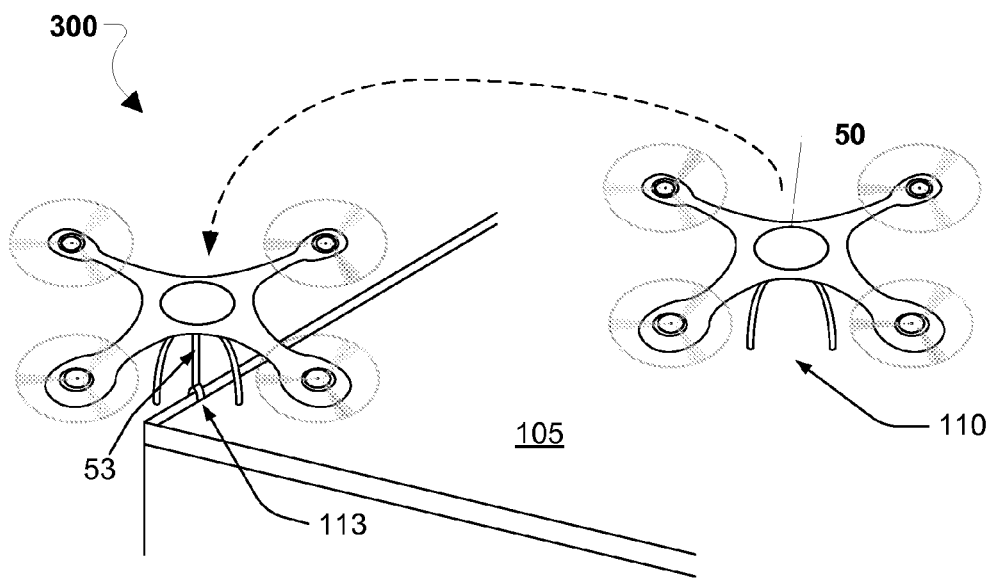
FIG. 3A is a schematic perspective view of a UAV changing positions at a site for stationary energy harvesting according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a method of exploiting opportunistic energy-harvesting conditions for an unmanned autonomous vehicle ("UAV"). The method may include the use of stationary energy harvesting by the UAV in response to determining that the UAV has insufficient onboard power to meet one or more mission power parameters. In order to select a site for performing energy harvesting or to determine whether a site is suitable for stationary energy harvesting by the UAV, a processor may access and assess energy-harvesting data in conjunction with the mission power parameters. The energy-harvesting data may be obtained by other UAVs or sensors located at a site and accumulated in a database, or may be obtained by the UAV performing a survey. In response to selecting a site that is determined to be suitable for stationary energy harvesting, the processor may adjust a course of the UAV, such as directing the UAV to the site for stationary energy harvesting.

As used herein, the terms "unmanned autonomous vehicle" (or "UAV") is used herein to refer to one of various types of autonomous vehicles (e.g., autonomous aircraft, land vehicles, waterborne vehicles, or a combination thereof) that may not utilize onboard, human pilots. A UAV may include an onboard computing device configured to operate the UAV without remote operating instructions (i.e., autonomously), such as from a human operator or remote computing device. Alternatively, the onboard computing device may be configured to operate the UAV with some remote operating instruction or updates to instructions stored in a memory of the onboard computing device. The UAV may be propelled for movement in any of a number of known ways. For example, a plurality of propulsion units, each including one or more propellers or jets, may provide propulsion or lifting forces for the UAV and any payload carried by the UAV for travel or movement through or across a fluid surface. In addition or alternatively, the UAV may include wheels, tank-tread, or other non-aerial/waterborne movement mechanisms to enable movement on the ground.

Further, the UAV may be powered by one or more types of power source, such as electrical, chemical, electro-chemical, or other power reserve, which may power the propulsion units, the onboard computing device and/or other onboard components. An example UAV is illustrated in FIGS. 1-7 in the form of an aerial UAV; however, the embodiments are not limited to aerial vehicles and may be implemented in any mobile robotic or autonomous vehicle (e.g., ground, aquatic, and/or space vehicles) or other type (manned or unmanned) of vehicle. While various embodiments are pertinent to any type of UAV, various embodiments are described with reference to aerial UAVs for ease of reference. However, the use of aerial UAVs as examples is not intended to limit the scope of the claims to autonomous aerial vehicles.

As used herein, the term "stationary energy harvesting" refers to a process of harvesting energy performed by a UAV while in a fixed position and/or in contact with an adjacent object and not generally moving relative to that adjacent object. In this way, the UAV may remain stationary in relation to the adjacent object to which it has secured itself. For example, the UAV may be in a fixed position (i.e., parked) and/or in contact with one or more objects, such as a man-made surface (e.g., asphalt, concrete, metal, wood, plastic, etc.), on a plant (e.g., trees, bushes, etc.), on a non-man-made surface (e.g., earthen materials, including rock, tree, plant, soil, dirt, sand, water, ice, etc.). The process of stationary energy harvesting performed by the UAV derives energy by conversion from a source of power (e.g., solar power, thermal energy, wind energy, and kinetic energy), and stores the energy (e.g., in a rechargeable battery) for use by the UAV.

As used herein, the terms "park," "parked," or "parking" refer to the act of bringing a UAV to a fixed position, which may include stopping, landing, hovering in-place, or floating in-place, for more than a brief period.

As used herein, the terms "site" or "energy-harvesting site" refer to a location occupied or available for occupancy, identifiable, or marked by some distinguishing feature delineating or denoting an area or space. For example, a site may denote a general area or a specific property, such as a structure or street address, or may be a single point location, such as a geographic coordinate. The area of a site may be defined by a point with a radius or a region with a perimeter. The site may include a series of regions or portions representing different positions of the site.

The term "computing device" is used herein to refer to an electronic device equipped with at least a processor. Examples of computing devices may include UAV travel control and/or mission management computers, mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

Figure 9:
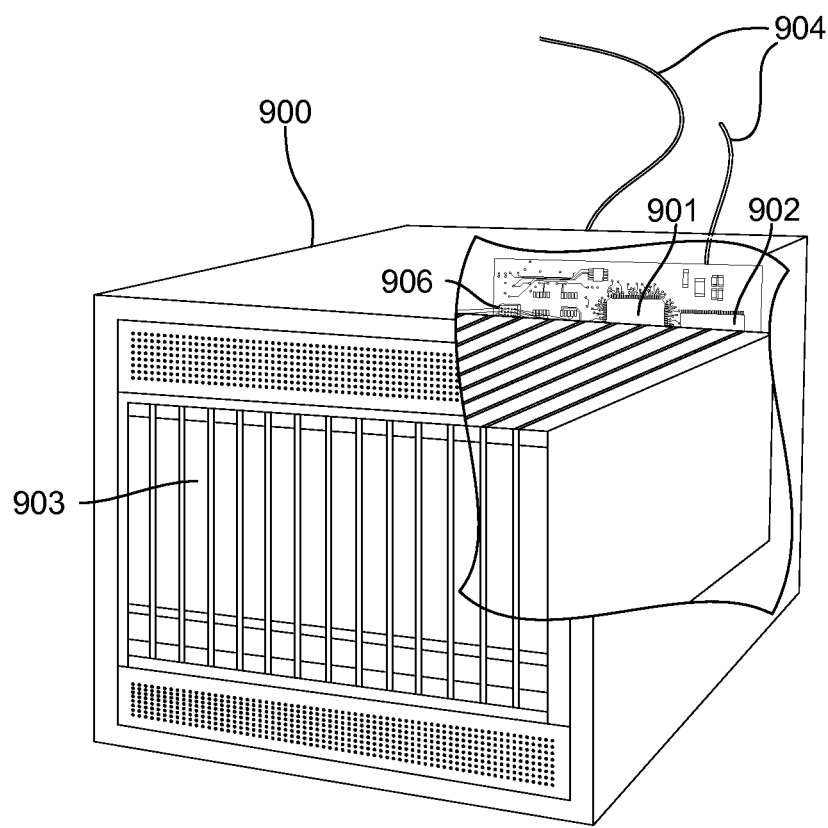
FIG. 9 is a component diagram of an example server suitable for use with the various embodiments.

The term "server" as used herein refers to any computing device capable of functioning as a server, such as a master exchange server, web server, and a personal or mobile computing device configured with software to execute server functions (e.g., a "light server"). Thus, various computing devices may function as a server, such as any one or all of cellular telephones, smart-phones, web-pads, tablet computers, Internet enabled cellular telephones, Wi-Fi® enabled electronic devices, laptop computers, personal computers, and similar electronic devices equipped with at least a processor, memory, and configured to communicate with a UAV. A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 9.

The word "exemplary" is used herein to mean "serving as an example, instance, or illustration." Any implementation described herein as "exemplary" is not necessarily to be construed as preferred or advantageous over other implementations.

The various embodiments may be implemented using a variety of UAV configurations. A propulsion source for a UAV may be one or more propellers that generate a lifting or propelling force sufficient to lift and/or move the UAV (including the UAV structure, motors, electronics, and power source) and any loads that may be attached to the UAV (e.g., a payload). The propulsion source may be powered by an electrical power source, such as a battery. In some embodiments, the propulsion source may be a fuel-controlled motor, such as one or more internal combustion motors. While the present disclosure is directed to examples of electric motor controlled UAVs, the claims and embodiments may be applied equally to UAVs powered by various additional types of power source.

Propulsion sources may be vertical or horizontally mounted depending on the movement mode of the UAV. A common UAV configuration suitable for use in the various embodiments is a "quad copter" configuration. In an example quad copter configuration, typically four (or more or fewer) horizontally-configured rotary lift propellers and motors are fixed to a frame. The frame may include a frame structure with landing skids that supports the propulsion motors, power source (e.g., battery), payload securing mechanism, and so on. A payload may be attached in a central area underneath the frame structure platform of the UAV, such as an area enclosed by the frame structure and skids underneath the power sources or propulsion units. A quad copter-style horizontal rotor UAV may travel in any unobstructed horizontal and vertical direction or may hover in one place. A quad copter UAV configuration is used for illustrative purposes in the examples described herein; however, other UAV designs may be used.

A UAV may be configured with processing components that enable the UAV to navigate, such as by controlling the motors to achieve directionality, and communication components that enable the UAV to receive position information and information from external systems including servers, access points, other UAVs, and so on. The position information may be associated with the current UAV position, waypoints, travel paths, avoidance paths/sites, altitudes, destination sites, locations of charging stations, relative locations of other UAVs, potential energy harvesting sites, and/or the like. The position information may be based on a relative position or an absolute position (i.e., geographic coordinates) obtained from a sensor (onboard or remote) or from communications with a computing device (e.g., server, global navigation satellite system (GNSS), or positioning beacon).

In accordance with various embodiments, the UAV may be configured to harvest energy from one or more external power sources, such as solar power, thermal energy, wind energy, kinetic energy, etc. In this way, the UAV may be equipped with one or more energy-harvesting components that the UAV may employ to harvest energy from an external power source. For example, an energy-harvesting component may include the rotors used by the UAV for propulsion may be used like wind turbines to generate electricity when rotated by wind or updrafts, thus harvesting wind energy. For example, a UAV configured to harvest wind energy when perched atop a tall building may shut down most power consuming components, allow wind to turn the rotors that drive the motors so that the motors function as generators to generate electricity that may be stored in onboard batteries of the UAV. Further, the UAV may take advantage of thermal exhausts, such as from rooftop commercial HVAC units, which may be exploited to collect thermal energy, in addition (or in place of) to the wind energy generated by the moving air expelled by exhaust units. In some embodiments, the UAV may include an energy-harvesting component in the form of solar cells for converting solar energy into electrical energy.

The UAV may periodically or continuously monitor available power and determine whether the UAV has enough power to reach its destination in accordance with mission power parameters. The mission power parameters may include power requirements for reaching the destination of a course of the UAV. Also, the mission power parameters may include or take into account a threshold level of reserve power allowing a margin of error (e.g., determined from a statistical error analysis). In addition, the mission power parameters may include information about payload encumbrances, route parameters, conditions that impact power consumption (e.g., inclement weather), deadlines (i.e., timing considerations), priority levels, and other information about one or more missions assigned to the UAV.

In case of an emergency or when available onboard power is insufficient to meet one or more mission power parameters, the UAV may assess available information to determine whether the UAV may take advantage of energy-harvesting opportunities. For example, when head winds are heavier than expected, the UAV will expend more power than expected to reach its destination, and therefore may need recharge by harvesting energy in order to reach the original destination.

Various embodiments include a UAV 50 configured to travel to a destination, or energy-harvesting site on its way to the destination. An energy-harvesting site 105 in the form of an urban rooftop environment is illustrated in FIG. 1. Such an environment 100 may experience frequent wind conditions that may be used by the UAV to replenish stored electrical power. The energy-harvesting site 105 is an example of a site in which the UAV may conduct stationary energy harvesting. While the energy-harvesting site 105 is illustrated as a commercial building, numerous other locations may be suitable to harvest energy in accordance with various embodiments.

When selecting from multiple available sites, the UAV 50 may assess any information about the harvesting potential and suitability of one or more sites, and select the best site based on various factors, such as the site that best meets the current mission power parameters of the UAV. For example, the UAV 50 may take many considerations into account, such as a highest potential for harvesting energy, safety, and/or the like, before selecting a particular site to harvest energy and adjusting course. Information about one or more potential energy harvesting sites is herein referred to as, "energy harvesting data."

Commercial buildings, such as the energy-harvesting site 105, offer many advantages for energy harvesting. For example, tenants do not generally frequent commercial building rooftops, which means humans will not tend to disturb the UAV 50 while the UAV 50 is on the rooftop. In addition, buildings that are taller than their neighbors will tend to have more sunlight exposure (e.g., with less shade than lower sites), as well as more steady winds that may facilitate harvesting wind energy. The advantages provided by any particular energy-harvesting site may be weighed to determine whether that site is suitable and/or preferred to other available sites. Sites other than commercial buildings may be considered for energy harvesting. For example, in more rural areas where elevation is not necessary to ensure sunlight exposure, steady winds, or security, an open field or other object may be optimal as an energy-harvesting site.

In FIG. 1, the UAV 50 is shown in a first position 110 near the edge of the roof that provides full exposure to sunlight 10 and wind 15 (e.g., prevailing wind). However, not all locations on a rooftop are necessarily as good as another location for energy harvesting. For example, a second position 112 at the energy-harvesting site 105, which is a shady spot behind a large object on the roof, is blocked from both the sun and the wind 15 during that time of day. The UAV 50 may try to avoid the second position 112 when parking at the energy-harvesting site 105, or at least try to avoid the second position 112 during that time of day. In contrast, a third position 115, which is in the parking lot adjacent the main building of the energy-harvesting site 105, has no shade and is fully exposed to the wind 15. However, an open parking lot may be accessible by many people or creatures that may pose a danger to the UAV.

Figure 4:
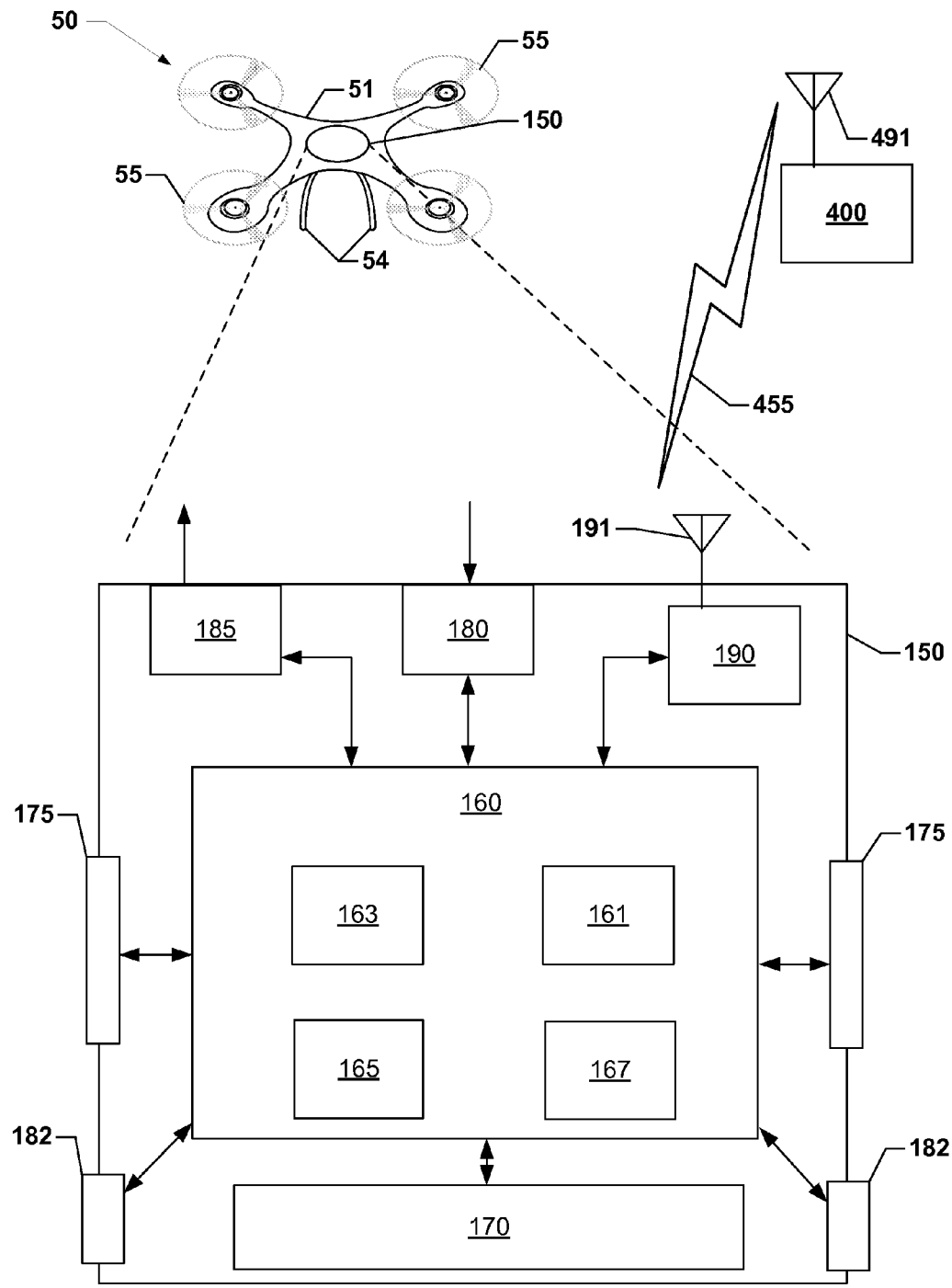
FIG. 4 is a perspective view of a UAV and a schematic relief diagram of a control unit and remote communication device according to various embodiments.
Figure 5:
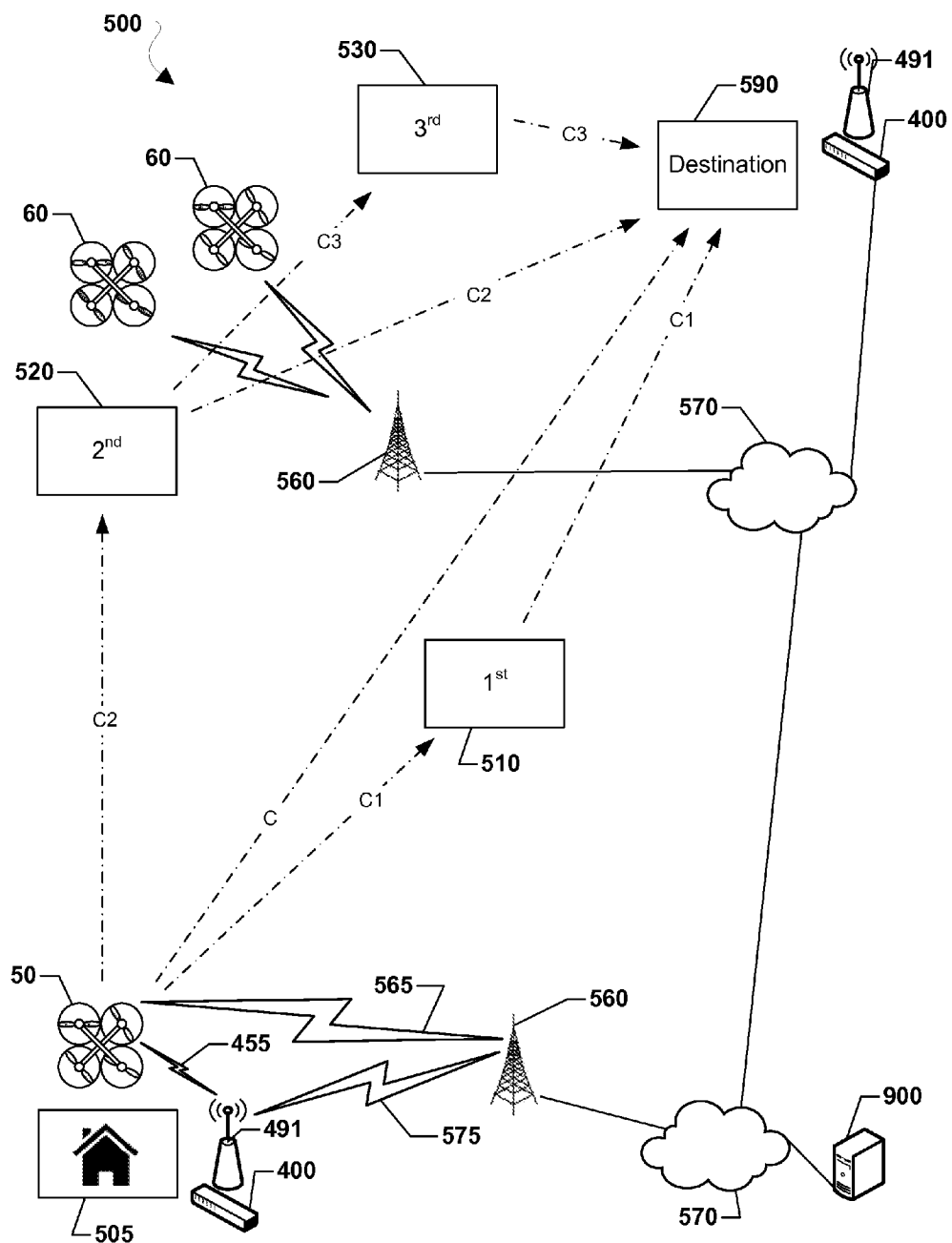
FIG. 5 is a diagram illustrating communication links between a UAV and system components suitable for use in various embodiments.

The UAV 50 may access energy harvesting data related to the energy-harvesting site 105 from an onboard source (e.g., memory 161, sensors 182, or input module 180 in FIG. 4) or a remote source (e.g., server 900 in FIG. 5). In addition, the energy harvesting data from a remote source may originate from other UAVs (e.g., 60 in FIG. 5), from sensors at the energy-harvesting site 105, or from reports by the UAV 50 from previous visits. For example, the server may provide general information about the coordinates of the energy-harvesting site 105 or other information such as time-of-day, sunrise/sunset, and weather related information. In addition, onboard sensors may provide more detailed energy harvesting data about the optimal location to harvest energy at the energy-harvesting site 105. Further, while harvesting energy at the energy-harvesting site 105, the UAV 50 may receive an energy-harvesting update (i.e., additional energy-harvesting data), such as information about an approaching storm 20. Storms or cloud-cover may hamper or place a time limit on how long the UAV 50 can successfully harvest solar energy at a particular site.

In various embodiments, the UAV 50 may change a position and/or configuration of an adjustable component, such as deploying a grappling component or redistributing elements, to help stabilize and/or secure the UAV 50 to a fixed surface. Grappling components may not only help maintain the UAV in a fixed position while taking advantage of high winds, but may also allow a UAV to position itself in unusual locations at a site as illustrated in FIGS. 2A and 2B. FIG. 2A is a top view of the building, which illustrates the UAV 50 taking advantage of wind 15. FIG. 2B is a close-up side elevation view of the UAV 50 in FIG. 2A, illustrating that the UAV 50 has deployed a grappling component 52 for securing the UAV 50 to the side vertical surface 111. The grappling component 52 may be a suction-type element, one with hooks/fasteners, or the like.

With reference to FIGS. 1-2B, the UAV 50 may use such grappling components (e.g., the grappling component 52 and/or the like) to perch on a side vertical surface 111 of the first position 110 near the roof's edge at the energy-harvesting site 105. Such equipment may enable the UAV 50 to orient its rotors 55 to face the wind in order to increase the efficiency of wind energy harvesting. The side vertical surface 111 also provides the UAV a position at the energy-harvesting site 105 that is out-of-reach from people, which provides an added security and safety benefit. In this way, the UAV may be secure and also avoid its rotors from coming into contact with others.

Different types of locations may be suitable as energy-harvesting sites, such as (but not limited to) power or communication towers, chimneys, walls, fences, street lights, road signs, billboards, windows, and/or the like. In addition, energy-harvesting sites are not limited to building rooftops or even man-made objects. For example, natural locations like trees, cliffs, hilltops, rocks, lakes, ponds, rivers, open fields, and/or the like may be suitable as a site for stationary energy harvesting. In addition, the sites for stationary energy harvesting may be impromptu sites or sites not officially designated for stationary energy harvesting. In some embodiments, the sites for stationary energy harvesting may be officially designated sites. Officially designated sites may provide added features, such as tethering stations that may include custom platforms, cables, or brackets to which the UAV 50 may be secured while harvesting energy.

Figure 3B:
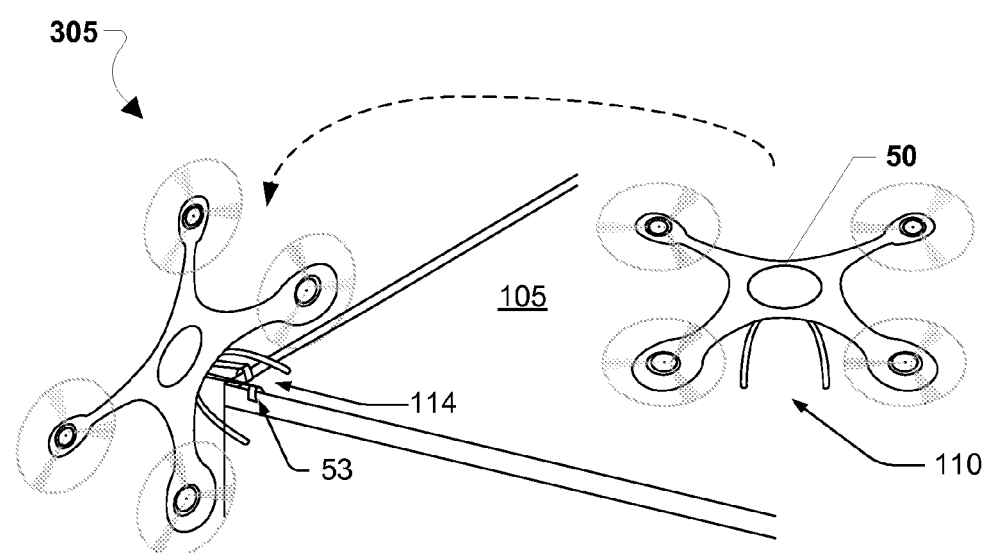
FIG. 3B is a schematic perspective view of a UAV changing an orientation and a component configuration at a site for stationary energy harvesting according to various embodiments.

In various embodiments, a UAV may change position and/or orientation while remaining substantially at one energy-harvesting site as illustrated in FIGS. 3A and 3B. With reference to FIGS. 1-3B, the UAV 50 is illustrated as changing positions and orientation while remaining substantially at the energy-harvesting site 105. The UAV 50 may change position or orientation for various reasons, such as to move to a more secure position or to optimize energy harvesting. In environment 300, the UAV 50 is illustrated as moving from the first position 110 to a fourth position 113 on the very edge of the building rooftop. At the edge of the building rooftop, the UAV 50 may take advantage of updrafts blowing up the side of the building for harvesting wind power. In addition to changing positions or orientations at the energy-harvesting site 105, the UAV 50 may also change a configuration of an adjustable component, such as deploying a grappling component 52, 53 (e.g., a grabbing tool) or moving an adjustable component to redistribute a weight of the UAV 50. The grappling component 53 or similar element may enable the UAV 50 to take advantage of a parapet or other object found on commercial building rooftops. The grappling component 53 may be designed to grip common objects, such as a building parapet. Similarly, the UAV 50 may be able to secure itself to a railing, pole, pipe, frame, wall, sign, and/or other object. An adjustable component may include a flight control surface (e.g., an aileron) or even a payload that may be configured in more than one position or orientation with respect to the UAV 50.

In environment 305, the UAV 50 is illustrated as moving from the first position 110 to a fifth position 114 that is slightly over the edge of the building rooftop at a corner. The fifth position 114 may enable the UAV to take advantage of crosswinds shearing across the top of the building for harvesting wind power. Once again, the UAV 50 may also change a component configuration by deploying the grappling component 53, which may include hooks with straps or other suitable mechanism that may tether to the parapet. In accordance with various embodiments, rotors not used for charging (e.g., rotors not harvesting much wind power due to their position in the wind) may be manipulated to keep the UAV in-place via airflow dynamics. While powered rotors may expend energy, the harvesting rotors may recover some of that energy from the added wind forces around the UAV 50, as well as the increased efficiencies the added stability may provide.

FIG. 4 illustrates a UAV, such as the UAV 50 in FIGS. 1-3, in accordance with various embodiments. With reference to FIGS. 1-4, the UAV 50 may include a number of rotors 55, a frame 51, and landing columns 54 or skids. The frame 51 may provide structural support for the motors associated with the rotors 55, the landing columns 54 may be sufficiently strong to support the maximum load weight for the combination of the components of the UAV 55 and, in some cases, a payload. For ease of description and illustration, some detailed aspects of the UAV 50 are omitted such as wiring, frame structure interconnects or other features that would be known to one of skill in the art. For example, while the UAV 50 is shown and described as having a frame 51 having a number of support members or frame structures, the UAV 50 may be constructed using a molded frame in which support is obtained through the molded structure. In the illustrated embodiments, the UAV 50 has four rotors 55. However, more or fewer than four rotors 55 may be used.

The UAV 50 may further include a control unit 150 that may house various circuits and devices used to power and control the operation of the UAV 50. The control unit 150 may include a processor 160, a power module 170, payload-securing units 175, an input module 180, sensors 182, an output module 185, and a radio module 190. The processor 160 may include or be coupled to memory 161 and a navigation unit 163. The processor 160 may be configured with processor-executable instructions to control travel and other operations of the UAV 50, including operations of the various embodiments. The processor 160 may be coupled to one or more payload-securing units 175 and sensors 182. The payload-securing units 175 may include an actuator motor that drives a gripping and release mechanism and related controls that are responsive to the control unit 150 to grip and release a payload in response to commands from the control unit 150.

The sensors 182 may be optical sensors, radio sensors, a camera, or other sensors. Alternatively or additionally, the sensors 182 may be contact or pressure sensors that may provide a signal that indicates when the UAV 50 has made contact with a surface. The power module 170 may include one or more batteries that may provide power to various components, including the processor 160, the payload-securing units 175, the input module 180, the sensors 182, the output module 185, and the radio module 190. In addition, the power module 170 may include energy storage components, such as rechargeable batteries. In this way, the processor 160 may be configured with processor-executable instructions to control the charging of the power module 170 (i.e., the storage of harvested energy), such as by executing a charging control algorithm using a charge control circuit. Alternatively or additionally, the power module 170 may be configured to manage its own charging. The processor 160 may be coupled to an output module 185, which may output control signals for managing the motors that drive the rotors 55 and other components, such as a grappling component 53 (FIG. 3B) and/or landing columns 54.

Through control of the individual motors of the rotors 55, the UAV 50 may be controlled as the UAV 50 progresses toward a destination. The processor 160 may receive data from the navigation unit 163 and use such data in order to determine the present position and orientation of the UAV 50, as well as the appropriate course towards the destination or intermediate sites. In various embodiments, the navigation unit 163 may include a GNSS receiver system (e.g., one or more global positioning system (GPS) receivers) enabling the UAV 50 to navigate using GNSS signals. Alternatively or in addition, the navigation unit 163 may be equipped with radio navigation receivers for receiving navigation beacons or other signals from radio nodes, such as navigation beacons (e.g., very high frequency (VHF) omni directional range (VOR) beacons), Wi-Fi® access points, cellular network sites, radio station, remote computing devices, other UAVs, etc.

The processor 160 and/or the navigation unit 163 may be configured to communicate with a server through a wireless connection (e.g., a cellular data network) to receive data useful in navigation, provide real-time position reports, and assess data. An avionics module 167 coupled to the processor 160 and/or the navigation unit 163 may be configured to provide travel control-related information such as altitude, attitude, airspeed, heading and similar information that the navigation unit 163 may use for navigation purposes, such as dead reckoning between GNSS position updates. The avionics module 167 may include or receive data from a gyro/accelerometer unit 165 that provides data regarding the orientation and accelerations of the UAV 50 that may be used in navigation and positioning calculations.

The radio module 190 may be configured to receive navigation signals, such as signals from aviation navigation facilities, etc., and provide such signals to the processor 160 and/or the navigation unit 163 to assist in UAV navigation. In various embodiments, the navigation unit 163 may use signals received from recognizable radio frequency (RF) emitters (e.g., AM/FM radio stations, Wi-Fi® access points, and cellular network base stations) on the ground. The locations, unique identifiers, signal strengths, frequencies, and other characteristic information of such RF emitters may be stored in a database and used to determine position (e.g., via triangulation and/or trilateration) when RF signals are received by the radio module 190. Such a database of RF emitters may be stored in the memory 161 of the UAV 50, in a ground-based server in communication with the processor 160 via a wireless communication link, or in a combination of the memory 161 and a ground-based server.

Navigating using information about RF emitters may use any of a number of conventional methods. For example, upon receiving an RF signal via the radio module 190, the processor 160 may obtain the signals unique identifier (e.g., a service sector identification (SSID), a media access control (MAC) address, radio station call sign, cell ID, etc.), and use that information to obtain the ground coordinates and signal strength of the detected RF emitter from the database of RF emitter characteristics. If the database is stored in the memory 161, the processor 160 may use the emitter identifier information to perform a table look up in the database. Alternatively or in addition, the processor 160 may use the radio module 190 to transmit the detected RF emitter identifier to a Location Information Service (LIS) server, which may return a location of the RF emitter obtained an RF emitter location database. Using the RF emitters' coordinates and optionally the signal strength characteristics, the processor 160 (or the navigation unit 163) may estimate the location of the UAV 50 relative to those coordinates. Using locations of three or more RF emitters detected by the radio module 190, the processor may determine a more precise location via trilateration. Estimates of location based on received ground-based RF emitters may be combined with position information from a GNSS receiver to provide more precise and reliable location estimates than achievable with either method alone.

The processor 160 may use the radio module 190 to conduct wireless communications with a variety of wireless communication devices (e.g., wireless communication device 400) such as a beacon, server, smartphone, tablet, or other computing device with which the UAV 50 may be in communication. A bi-directional wireless communication link (e.g., wireless signals 455) may be established between a transmit/receive antenna 191 of the radio module 190 and a transmit/receive antenna 491 of the wireless communication device 400. In an example, the wireless communication device 400 may be a cellular network base station or cell tower (e.g., 560 in FIG. 5). The radio module 190 may be configured to support multiple connections with different wireless communication devices (e.g., wireless communication device 400) having different radio access technologies. In various embodiments, the wireless communication device 400 may be connected to a server (e.g., 900 in FIG. 5) through intermediate access points. In an example, the wireless communication device 400 may be a server of a UAV operator, a third party service (e.g., package delivery, billing, etc.), or a site communication access point. The UAV 50 may communicate with a server through one or more intermediate communication links, such as one or more network nodes or other communication devices.

In various embodiments, the radio module 190 may be configured to switch between a cellular connection and a Wi-Fi® or other form of radio connection depending on the location and altitude of the UAV 50. For example, while in flight at an altitude designated for UAV traffic, the radio module 190 may communicate with a cellular infrastructure in order to maintain communications with a server. An example of a flight altitude for the UAV 50 may be at around 400 feet or less, such as may be designated by a government authority (e.g., FAA) for UAV flight traffic. At this altitude, it may be difficult to establish communication with some of the wireless communication devices using short-range radio communication links (e.g., Wi-Fi®). Therefore, communications with other wireless communication devices may be established using cellular telephone networks while the UAV 50 is at flight altitude. Communication between the radio module 190 and the wireless communication device 400 may transition to a short-range communication link (e.g., Wi-Fi® or Bluetooth®) when the UAV 50 moves closer to the wireless communication device 400. Similarly, the UAV 50 may include and employ other forms of radio communication, such as mesh connections with other UAVs or connections to other information sources (e.g., balloons or other stations for collecting and/or distributing weather or other data harvesting information).

In various embodiments, the control unit 150 may be equipped with the input module 180, which may be used for a variety of applications. For example, the input module 180 may receive images or data from an onboard camera or sensor, or may receive electronic signals from other components (e.g., a payload). The input module 180 may receive an activation signal for causing actuators on the UAV to deploy clamps (e.g., grappling component 53) or similar components for securing itself at in impromptu energy-harvesting site. In addition, the output module 185 may be used to activate components (e.g., an energy cell, an actuator, an indicator, a circuit element, a sensor, a grappling component 53, adjustment of landing columns 54, and/or an energy-harvesting element).

In the various embodiments, the wireless communication device 400 may be associated with a home terminal, a destination site, and/or an energy-harvesting site. For example, the wireless communication device 400 may be a beacon device emitting a navigation signal identifying or indicating a more precise location of the energy-harvesting site. As another example, the wireless communication device 400 may be wireless access point or cellular network base station coupled to a server associated with the home terminal, the destination site, and/or the energy-harvesting site. The server may use the wireless communication device 400 to communicate with the UAV 50 when the UAV 50 is at or near a particular location. In addition, the server may exchange coordinates or other information related to the energy-harvesting site(s) with the UAV 50 through a data connection established with the UAV 50 (e.g., through a cellular data connection maintained by the UAV 50 with a cellular network).

While the various components of the control unit 150 are illustrated in FIG. 4 as separate components, some or all of the components (e.g., the processor 160, the output module 185, the radio module 190, and other units) may be integrated together in a single device or module, such as a system-on-chip module.

FIG. 5 illustrates an operating environment 500 for a UAV, such as the UAV 50 in FIGS. 1-4, in accordance with various embodiments. With reference to FIGS. 1-5, the operating environment 500 may include a UAV base 505 and a destination 590. The UAV base 505 may be a "home" location for the UAV 50 or any predetermined or designated starting point for a transit by the UAV 50. The UAV base 505 may also be a predetermined or designated area to which the UAV 50 may be configured to return. A server 900 (e.g., via the wireless communication device 400) may provide coordinates of the destination 590 to the UAV 50. In various embodiments, the UAV 50 may be programmed with the coordinates of its destination 590, such as from mission power parameters received when the UAV 50 is assigned for a mission or while the UAV 50 is in transit to a destination.

The operating environment 500 may also include potential energy-harvesting sites, such as a first energy-harvesting site 510, a second energy-harvesting site 520, and a third energy-harvesting site 530. The energy-harvesting sites 510, 520, 530 each represent a location determined to be potentially suitable for the UAV 50 to perform stationary energy harvesting. The server 900 may designate one or more alternative courses C1, C2, C3, different from the original course C, for the UAV 50 to travel in order to reach the energy-harvesting sites 510, 520, 530, intermediate to the destination 590.

The UAV 50 may be provided ahead of time with energy-harvesting data regarding the energy-harvesting sites 510, 520, 530. The server 900 may compile such energy-harvesting data about the energy-harvesting sites 510, 520, 530 from prior visits by the UAV 50, information received from other UAVs 60, information collected by sensors located at the energy-harvesting sites 510, 520, 530 (e.g., sensors deployed by the UAV 50, other UAVs 60, or placed there by other means), or information otherwise obtained and maintained by the server 900. Alternatively, the UAV 50 may autonomously identify one or more of the energy-harvesting sites 510, 520, 530, such as the first energy-harvesting site 510 that is not far from the original course C to the destination 590. Thus, the UAV 50 may perform a real-time site survey in order to assess a site and determine whether that site is suitable for energy harvesting.

The UAV 50 may establish and maintain communication with the server 900 while the UAV 50 is at the UAV base 505 to facilitate the dispatch of the UAV 50 to the destination 590 and/or one or more of the energy-harvesting sites 510, 520, 530. In various embodiments, the UAV 50 may establish a direct connection with the server 900 while at the UAV base 505 and/or may communicate with the server 900 through a cellular data network connection. For example, the UAV 50 may establish a wireless connection 565 with a cellular infrastructure component 560 of a cellular service provider. The wireless connection may be a data connection that provides a connection with the server 900 through a public network, such as a telecommunication network 570, while the UAV 50 is on the ground, under water, on a water surface, and/or in flight. The UAV 50 may establish multiple wireless connections simultaneously.

Upon receiving information regarding the destination 590, the UAV 50 may be dispatched from the UAV base 505 to travel to the destination 590. The UAV 50 may determine an original course C to the destination 590 based on various constraints, such as (but not limited to) ground safety considerations, altitude restrictions, obstacles (e.g., buildings, mountains, towers, no-fly zones, etc.), weather conditions, irretrievability considerations, efficiencies (e.g., most fuel efficient route, shortest distances to travel), communication signal levels/availability, mission power parameters, and/or the like. For example, in the event the UAV 50 lands, crashes, is disabled, or stops while traveling to or from its destination, the UAV 50 may be configured to do so in an area in which the UAV is less likely to endanger humans or damage property, the UAV 50 may be easily retrieved, the UAV 50 may maintain communication with other devices (e.g., cell towers, other access points, or other UAVs, etc.), and/or the like. The UAV 50 may use GNSS signals from GNSS satellites to determine progress toward the destination 590 of the UAV 50, including progress towards waypoints defining the original course of the UAV 50.

The UAV 50 may establish the wireless connection 565 with the cellular infrastructure component 560 to facilitate communications with the server 900 through the telecommunication network 570 while traveling. In various embodiments, the UAV 50 may use information from the server 900 to avoid entering restricted areas or identify intermediate sites, such as for stationary energy-harvesting, or alternate courses.

In various embodiments, the UAV 50 may be configured to periodically check the functioning of the navigation unit 163 and/or communication links with the server 900. Such functionality may be checked through a periodic heart beat check. For example, the UAV 50 may receive periodic communications from the server 900 indicating that the wireless connection 565 is still maintained and viable. Alternatively or in addition, the UAV 50 may send periodic communications to the server 900 providing current location coordinates of the UAV 50 and/or indicating that the navigation unit 163 and other UAV systems are still functioning. If the processor 160 of the UAV 50 determines that the navigation unit 163 and other UAV systems are not functioning, corrective action may be taken. For example, in the event the UAV 50 loses contact with an information source or other communication link, such as due to jamming, pirate signals, masking by buildings, or tampering of the UAV 50, and the UAV 50 has no other way to determine location, the UAV 50 may issue an alert to the server 900 and park. While parked, or as it searches a safe place to stop, the UAV 50 may exploit energy harvesting, if conditions warrant. In this way, the UAV 50 may autonomously identify impromptu potential energy-harvesting locations, or use information the UAV 50 already has to locate a nearby site. As another example, in the event the UAV 50 loses contact with GNSS satellites, the UAV 50 may fall back to using alternative navigation methods (e.g., trilateration based on signals detected from identifiable RF emitters as described).

The UAV 50 may receive signals from the wireless communication device 400 through wireless signals 455 as the UAV 50 progresses toward the destination 590. The wireless signals 455 may provide information about the respective wireless communication devices, such as an SSID, a MAC address, a cell tower ID, etc. The wireless signals 455 may indicate to the UAV 50 that the respective areas are friendly/restricted or may include energy-harvesting data. The wireless signals 455 may contain additional information, such as details regarding one or more nearby or en-route energy-harvesting sites. The wireless communication devices may communicate with the telecommunication network 570 through wired connections and/or a network wireless connection 575. For example, a smart phone operating as the wireless communication device 400 may communicate wirelessly using short-range communications (e.g., Wi-Fi® or Bluetooth®) or long-range communications (e.g., cellular).

In various embodiments, the information in the wireless signals 455 may be used by the UAV processor 160 to self-locate, report location information, receive mission information (e.g., mission power parameters) or exchange energy-harvesting data. For example, when the UAV 50 is dispatched from the UAV base 505 on an initial course C, the UAV 50 may receive information from the server 900 regarding energy-harvesting sites nearby or en-route, such as the first energy-harvesting site 510, the second energy-harvesting site 520, and/or the third energy-harvesting site 530. While traveling, the UAV 50 may maintain the wireless connection 565 with the server 900 through the cellular infrastructure component 560 and the telecommunication network 570. Based on information received from the server 900, the UAV 50 may exploit one or more energy-harvesting sites or proceed toward the destination 590 along the initial course C.

The UAV 50 may make contact with the wireless communication device 400 when the radio module 190 of the UAV 50 begins receiving the wireless signals 455 from the wireless communication device 400. The UAV 50 may determine the location of intermediate sites obtaining identification (e.g., SSID) and possibly other information from wireless communication devices within range. In the event the determined current location and bearing information indicates that the UAV 50 is off course, the UAV 50 may make course corrections as the UAV 50 proceeds to the destination 590. Also, the UAV processor 160 may determine that it should distrust the GNSS system-determined location, as such information may be corrupted by pirated or jammed signals, and take corrective actions, such as parking at a secure location, returning to UAV base 505, or falling back onto dead-reckoning navigation in combination with alternative navigation. In addition, someone jamming signals may hope to encourage the UAV 50 to park at a nearest location in order to gain access to the UAV 50. Thus, the UAV 50 may be instructed or programmed to park in a nearest secure location when location information is unreliable. The location information determination operations may be repeated each time a new wireless communication device is encountered.

In various embodiments, as the UAV 50 approaches the destination 590 or the energy-harvesting sites 510, 520, 530, a communication link may be established with the wireless communication device 400 at or near a parking zone. For example, the UAV 50 may detect the wireless signals 455 from the wireless communication device 400 (e.g., smart phone) of a person awaiting the UAV 50, and conduct final location determination operations with the wireless communication device 400 information. Alternatively or additionally, the UAV 50 may use the wireless signals 455 to establish a connection with the server 900, such as through the telecommunication network 570 by way of the wireless communication device 400. Through such connections the UAV 50 may receive additional navigational, updated, or other information useful for supporting one or more missions. For example, the UAV 50 may use updated mission power parameters or updated energy-harvesting data to adjust the initial course C in order to exploit energy harvesting opportunities. In this way, an intermediate waypoint may be assigned and the UAV 50 instructed to follow the first course C1 to the first energy-harvesting site 510. The first energy-harvesting site 510 information may be conveyed to the UAV 50 through one or more wireless connection 565 along with additional information regarding further details about the first energy-harvesting site 510 or other energy harvesting sites (e.g., 520, 530).

Before reaching the destination 590, the UAV 50 may change course based on updated information received regarding mission power parameters or energy-harvesting data. The UAV 50 may access a parameter update to the mission power parameters or an energy-harvesting update at any point along any course or while at a site. For example, based on a sensor reading at a particular energy-harvesting site, the UAV 50 may determine current energy-harvesting rates are lower than expected. In response to accessing such information, the UAV 50 may reassess the suitability of an energy-harvesting site, such as the first energy-harvesting site 510. Alternatively, one or more of the other UAVs 60 may have reported better than normal energy-harvesting conditions relating to an alternative energy-harvesting site, such as the second energy-harvesting site 520. As a further alternative, the server 900 may provide information indicating either mission power parameters or energy-harvesting conditions have changed such that the UAV 50 may need to reassess the suitability of the first energy-harvesting site 510 and may change course to the second course C2 toward the second energy-harvesting site 520.

Figure 6:
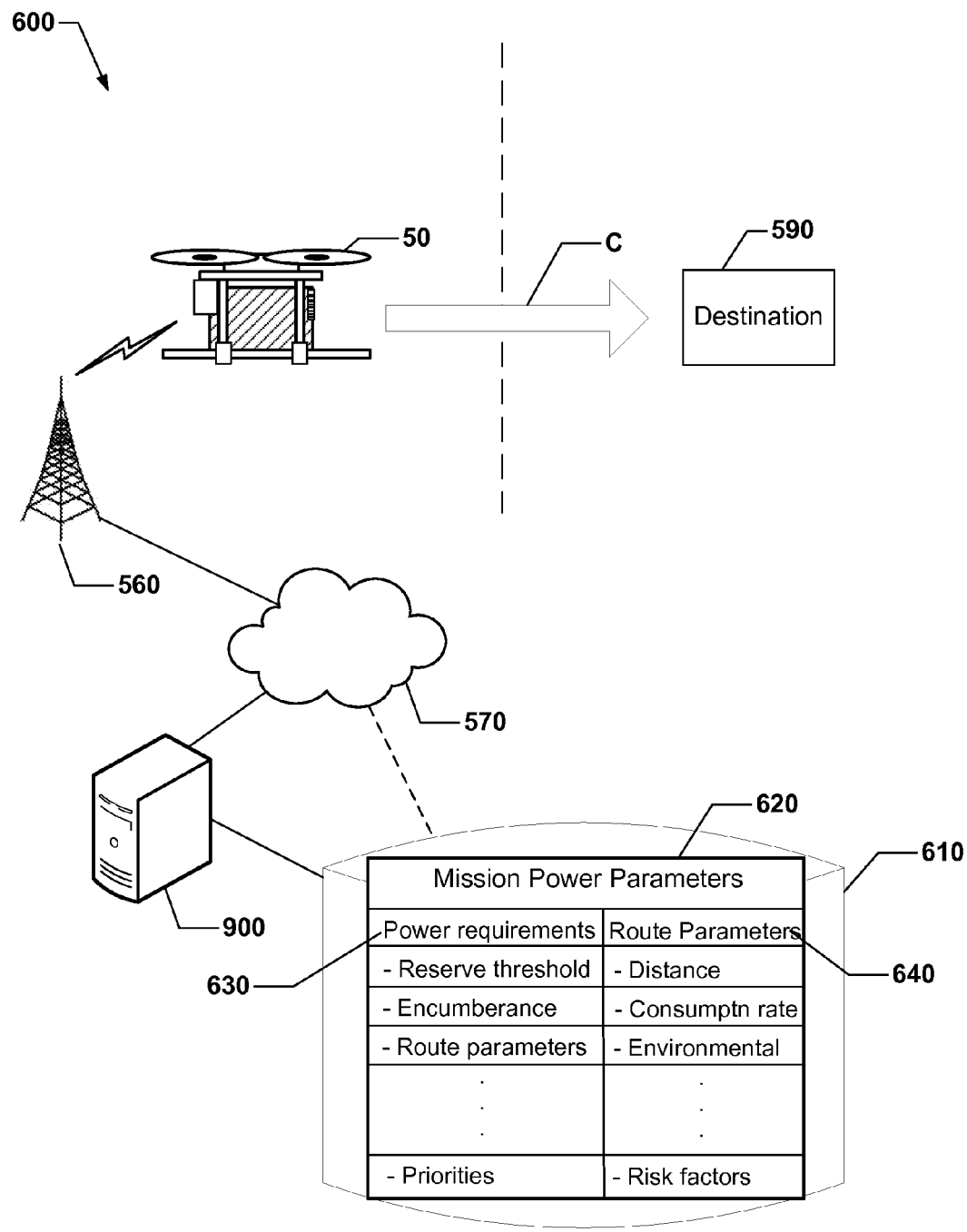
FIG. 6 is a schematic diagram illustrating a UAV in communication with a processor determining mission power parameters according to various embodiments.

In various embodiments, a UAV, such as the UAV 50 in FIGS. 1-5, may receive mission information, such as mission power parameters from a remote computing device, such as a server, as illustrated in FIG. 6. With reference to FIGS. 1-6, the UAV 50 in an environment 600 may communicate with the server 900 regarding mission power parameters maintained in a database 620 of a data storage device 610. Mission power parameters may also be stored in an onboard memory (e.g., 161) of the UAV 50. The UAV 50 may exchange communications with the server 900, for example via the cellular infrastructure component 560 and the telecommunication network 570 or other wireless device (e.g., 400 in FIGS. 4 and 5), while moving or stationary. Such communications may enable the UAV 50 to receive mission power parameters or parameter updates to mission power parameters while at the UAV base (e.g., 505), while on the initial course C toward the destination 590, on another course, or while at an energy-harvesting site.

In the environment 600, the database 620 maintained on the data storage device 610 that is accessible to the server 900 may include information regarding one or more missions assigned to the UAV 50. A mission may involve travel from one location to park at a destination, such as to deliver a payload, but may involve alternatively activities, such as aerial surveillance in which the UAV needs to stay airborne at the destination for a define period of time before returning. The database 620 may store various types of information and levels of detail regarding mission power parameters. For example, the mission power parameters may include details regarding power requirements 630 of one or more missions. The power requirements may further include sub-elements 640, such as route parameters, reserve power thresholds, payload encumbrances, temporal parameters, and priorities. The UAV 50 may compare such power requirements to current onboard power levels in order to determine whether the UAV 50 has sufficient onboard power to safely complete all missions or select missions. Temporal parameters, may include mission timing, deadlines, time-of-day, date, or other information associated with time. In addition, since mission power parameters may change, the UAV 50 may be provided with updates to mission power parameters from time to time.

In accordance with various embodiments, the mission power parameters may include sub-elements 640, such as route parameters. The route parameters may include projected energy expenditures associates with a particular course, such as the initial course C, to the destination 590. Such projected energy expenditures may be determined, based on distance or travel times, and recalculated in real-time. In addition, route parameters may include other factors associated with a course, such as higher or lower than normal power consumption rates. Mission power parameters may identify a minimum power level (or reserve power level) that must be maintained at each stage in a mission in order to provide safe margins for handling unexpected problems, such as weather issues, payload issues, or hardware issues that could require an emergency divert or consume more power than expected. If power reserves on the UAV fall below such minimums, parking at a suitable site may be required to recharge batteries via energy harvesting, or other mechanisms (e.g., wireless/wired charging, battery swap, or even refueling for UAVs with a combustion engine).

The route parameters may include environmental resistance factors, such as heavy headwinds, precipitation, or stormy weather. Route parameters may include risk factors associated with a course in which security or safety is a concern, and minimum power level. The minimum power levels that must be maintained over the route may be adjusted based on the risks, such as increasing the reserve power level required as assessed risks increase. Routes that involve long distances with no or very limited refueling options or no available communications (i.e., cellular or satellite black zones) may be considered high risk. For example, routes that traverse a large body of water, mountain, desert, or must reach a very remote location may be associated with higher risk, which may influence power reserve thresholds.

In various embodiments, reserve power thresholds may be a value associated with a predetermined percentage or quantity of onboard power recommended be kept in reserve for a mission at various phases in the travel path (e.g., midway, at the destination, before starting to park, etc.). Alternatively, the value of the reserve power thresholds may be measured in terms of motor hours (i.e., a period of time in which one or more motors expend onboard power) or a distance/range that the UAV may achieve using onboard power stores. Higher reserve power thresholds may be used for missions with more uncertainty regarding needed power. For example, risk factors from route parameters may increase the value of the reserve power threshold specified for a mission. A total mission power requirement may include an amount of power reflected by the reserve power threshold, in addition to projected power expenditures for the mission.

In various embodiments, the mission power parameters may include other sub-elements, such as payload encumbrances, deadlines, and/or priorities. Payload encumbrances may reflect the weight and size of a payload, including dimensions thereof and/or other information relating to the payload. An oddly shaped or large payload may affect the aerodynamics of the UAV 50, which may be taken into account in determining the power stores needed for a mission. A deadline may reflect a completion time or date for a mission. Priorities may reflect an order in which missions should be accomplished and/or a value or perishable nature of a payload. For example, certain payloads that are too valuable (i.e., are assessed as having too high a value) or are perishable may need to avoid stops, such as for stationary energy harvesting. Similarly, high value payload may need to avoid interactions with humans or creatures that might compromise the payload.

Figure 7:
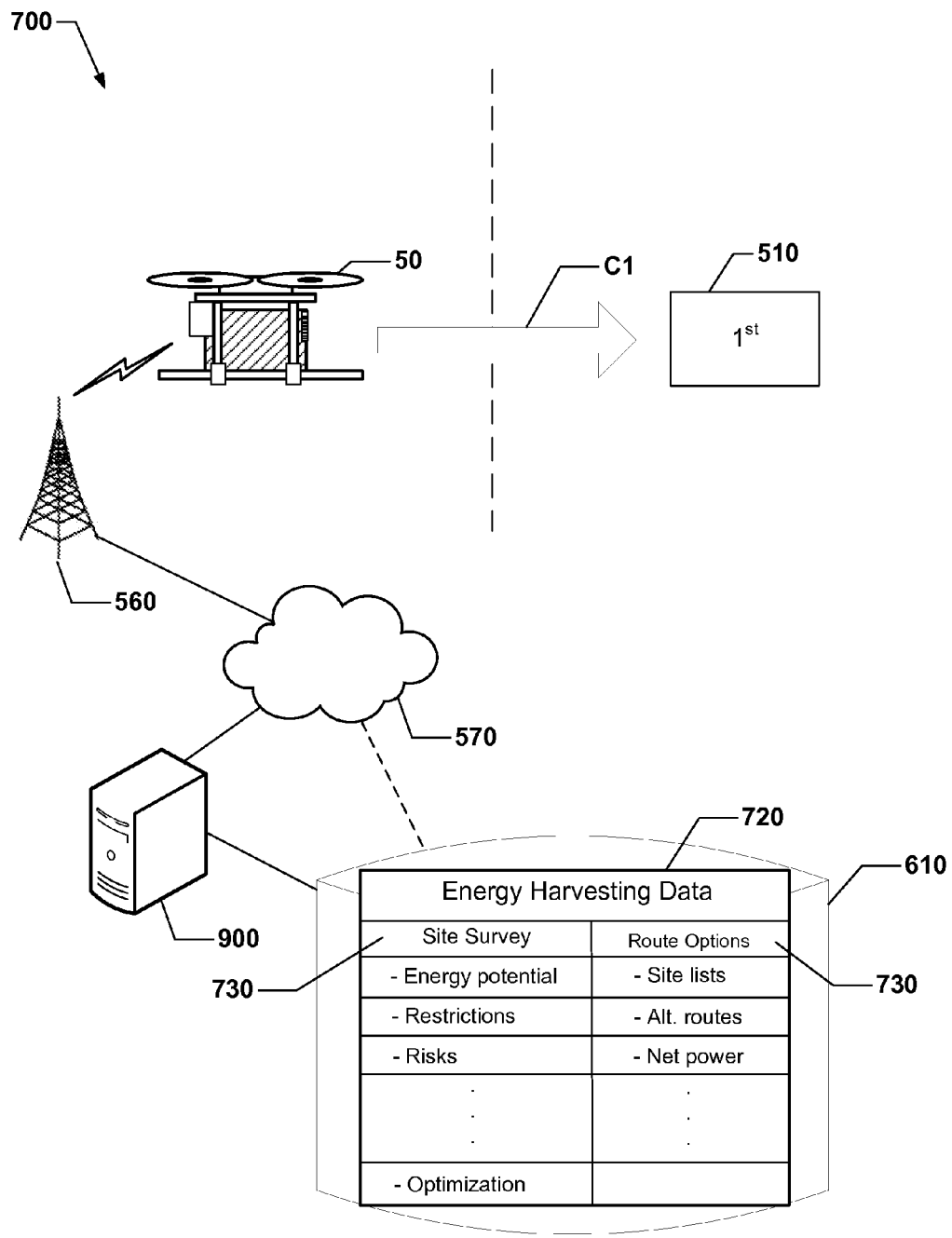
FIG. 7 is a schematic diagram illustrating a UAV in communication with a processor assessing energy-harvesting data according to various embodiments.

In various embodiments, a UAV, such as the UAV 50 in FIGS. 1-6, may access information, such as energy-harvesting data from onboard sensors, onboard memory, and/or a remote computing device as illustrated in FIG. 7. With reference to FIGS. 1-7, the UAV 50 in an environment 700 may communicate with the server 900 regarding energy-harvesting data maintained in a database 720 of a data storage device 610. The UAV 50 may exchange communications with the server 900, for example via the cellular infrastructure component 560 and the telecommunication network 570 or other wireless device (e.g., 400 in FIGS. 4 and 5), while moving or stationary. Via such communications, the UAV 50 may receive or transmit energy-harvesting data or an update to energy-harvesting data (i.e., an energy-harvesting update) while at the UAV base (e.g., 505), while on the first course C1 toward the first energy-harvesting site 510, on another course, or while at the first energy-harvesting site 510 or another energy-harvesting site.

In the environment 700, the database 720 is described herein in further detail with regard to energy-harvesting data stored in the data storage device 610, however the same or similar information may be stored in the onboard memory (e.g., 161) of the UAV 50 or another UAV (e.g., 60). The energy-harvesting data in the database 720 may include various types of information regarding sources of information, sites for harvesting energy, and/or courses to potential energy-harvesting sites. The UAV 50 may assess the suitability of a particular energy-harvesting site, including the course to get there, based on the energy-harvesting data in conjunction with the mission power parameters.

In accordance with various embodiments, the energy-harvesting data may include energy-harvesting elements 730, such as site survey information. Site survey information may reflect available information about a potential site for harvesting energy, such as estimates of how much energy may be harvested from a site, or availability, restrictions and/or risks associated with the site. Energy harvesting sites, particularly popular sites, may get crowded with more than one UAV. To address this, site survey information may reflect the number of UAV that are currently using one or more energy-harvesting sites and whether a spot at a particular site is available.

Some energy harvesting sites may have time-of-day restrictions, require certain authorizations, or have other access limitations. Risks at a site may reflect a likelihood that people or creatures might interfere or tamper with the UAV 50. For example, the energy-harvesting data may reflect a preference for the rooftops of commercial buildings, which tend to be safer than high-traffic areas. Risks assessments may also reflect how stable or reliable the positions at a site may be for a UAV 50. For example, loose surfaces or fixtures that yield or collapse under the weight of a UAV may increase the risk of a site. Similarly, a moving energy-harvesting site, such as the top of a truck, bus, train, or other motor vehicle, may be considered a high risk site, particularly on routes in which the UAV may experience extreme turbulence. Also, the risk may reflect the irretrievability of the UAV 50 should it be disabled at the site.

In addition, site survey information may include optimization details regarding a site. For example, a best approach to a site, details regarding a precise parking location, existence of added features such as tethering stations, position and/or orientation, as well as movement requirements at a site (e.g., due to shade patterns, light levels, or wind patterns). Further, site survey information may include details regarding how many UAVs an energy-harvesting site may accommodate, how many UAVs are currently positioned at an energy-harvesting site, or scheduling information reflecting peak usage times, off-peak usage times, average usage times, or the like. In this way, the fact that a particular energy-harvesting site is too crowded with other UAVs harvesting energy may be reflected in the energy-harvesting data for use when assessing that energy-harvesting site.

In some embodiments, the energy-harvesting data may include route options within the energy-harvesting elements 730. Route options may provide coordinates and navigational directions to one or more energy-harvesting sites. The route options may also include more than one course that could be used to reach a particular energy-harvesting site. In addition, the route options may include power requirements for reaching the energy-harvesting site. An energy expenditure associated with completing a course to an energy-harvesting site may be offset from an energy harvesting potential of the energy-harvesting site in order to better assess the suitability of that energy-harvesting site. Route options may also include non-power related risk assessments, such as irretrievability, tampering (i.e., potential aerial attack), and environmental hazards.

In some embodiments, the energy-harvesting data may include details regarding a source or sources of information from which the energy-harvesting data may be obtained. Such information regarding energy-harvesting sites may include or be based on historical and/or current data about the suitability of the sites and harvestable power that has been observed. The UAV 50 may receive such information from a remote source (e.g., the server 900, a remote sensor, or other UAVs 60) and/or from a real-time site survey performed/compiled by the UAV 50 itself. In addition, the energy-harvesting data may include ratings or rankings for information or sources of information from which energy-harvesting data has previously been obtained. The ratings or ranking may be used to indicate the trustworthiness or reliability of information or its source.

In addition to information from remote sources, the UAV 50 may use onboard and/or deployable sensors to find and evaluate a particular energy-harvesting site. For example, an onboard camera, anemometer, humidity (i.e., rain) gauge, and/or other sensor(s) may help find an energy-harvesting site and assess conditions once on-site. A deployable sensor may be dropped or ejected from the UAV 50. Alternatively, the deployable sensor may itself be a UAV-type component configured to autonomously move away from (and optionally return to) the UAV 50. The UAV 50 may store data from onboard sensors in the onboard memory (e.g., 161) and share the data with the server (e.g., 900), which in-turn may further share the data with other UAVs (e.g., 60). In addition, while at a particular energy harvesting site, the UAV 50 may be configured to analyze real-time data obtained by an onboard or remote on-site sensor for assessing the suitability of the energy-harvesting site for stationary energy harvesting.

In some embodiments, the databases 620, 720 may be stored in memory (e.g., 161 or the like) of the UAV 50. The UAV 50 may receive updated database information from a server (e.g., 900) at regular intervals (e.g., hourly, daily, etc.), and use such information to update the databases 620, 720 stored in onboard memory.

By maintaining a local version of the database, the frequency of communications between the UAV 50 and the server 900 may be reduced, which may reduce overhead, traffic load, etc. Reducing the need to communicate with the server 900 may be advantageous in circumstances in which WAN connectivity or connectivity with other networks is unavailable or unreliable.

In some embodiments, the information stored in the memory of the UAV 50 may have a limited useful life, which may be indicated when the information is obtained (e.g., by an expiration time). The UAV 50 may track the expiration of the information stored in the memory using a timer or the like. For example, if the database information has expired or is otherwise beyond the indicated useful life, the UAV processor may contact the server to reload the latest database information. In some embodiments, a UAV storing expired database information may not be allowed to deviate from a current course, except in an emergency.

In various embodiments, the UAV 50 may communicate with the server 900 before the UAV 50 starts moving, as the UAV 50 starts moving, or at other designated times in order to confirm that the latest information update for the databases 620, 720 has been loaded. Once the information is confirmed as current or updated, the UAV 50 may proceed without communications with the server 900 until the expiration of the timer or upon occurrence of some other predetermined event (e.g., query by a third party).

Although only a single one of the server 900 is shown in the operating environments 500-700, the databases 620, 720 or the information in the databases 620, 720, may be distributed among many servers. Alternatively or additionally, the servers may be redundant, so that the UAV 50 may be configured to communicate with a selected one of the servers. The selection of a server with which to communicate may be based on a criteria or condition, such as the proximity of the server to the UAV 50, the wireless link quality between the server and the UAV 50, an affiliation or classification of the server (e.g., military, government, commercial, private, etc.), a reputation of the server, an operator of the server, and so on.

In some embodiments, the database information stored and/or maintained on a given server (e.g., 900) may be populated by other servers (or entities) or by access to other servers (or entities). For instance, a server may be configured to query or otherwise obtain event information from an entity/server associated with a restricted area in which an event may be taking place or may be scheduled to take place in the restricted area.

Figure 8:
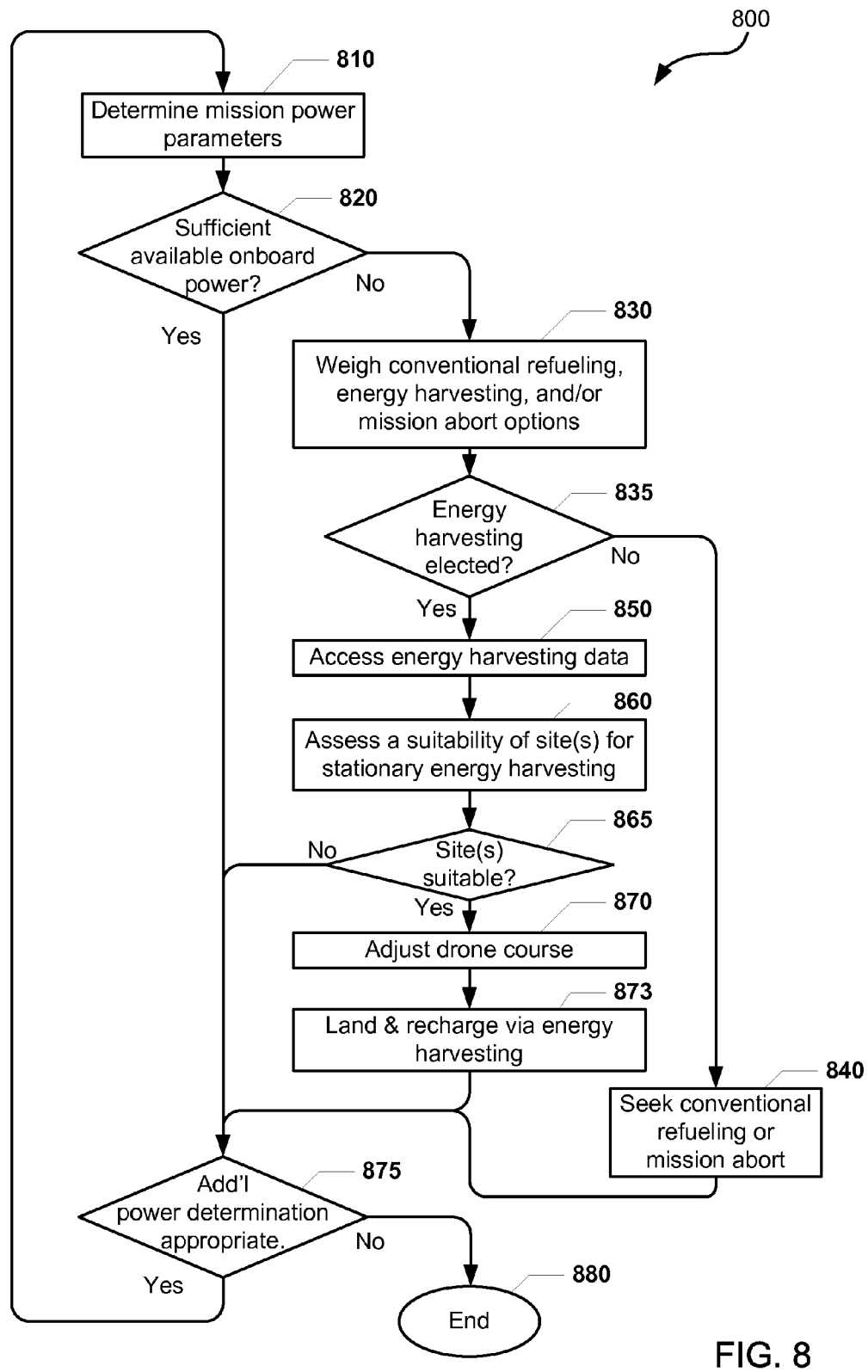
FIG. 8 is a process flow diagram illustrating a method of exploiting opportunistic energy harvesting conditions for a UAV according to various embodiments.

FIG. 8 illustrates a method 800 of exploiting opportunistic energy-harvesting conditions for a UAV according to various embodiments. With reference to FIGS. 1-8, operations of the method 800 may be performed by a UAV control unit (e.g., 150) or other computing device (e.g., wireless communication device 400) of a UAV (e.g., 50).

In block 810, the processor of a UAV (e.g., the processor 160 in the control unit 150 or processor in the wireless communication device 400) may determine mission power parameters for the UAV. The mission power parameters may be determined from information received from a remote source, such as through wireless communications (e.g., via a transmit/receive antenna 191), from an onboard sensor (e.g., 182), from onboard components (e.g., via the input module 180), or manually from a user or operator of the UAV. For example, the mission power parameters may be embedded in a signal sent from a UAV operator (e.g., through a remote user interface on the wireless communication device 400 or through a user interface directly on the UAV). The mission power parameters may include raw data, such as one or more values corresponding to mission power requirements. Alternatively, the mission power parameters may include processed data indicating elements such as reserve power threshold, payload encumbrances, course parameters, deadlines, or priorities. As a further alternative, the mission power parameters may include a combination of raw and processed data.

The processor may access the mission power parameters in response to an initial power assessment or after earlier assessments. In addition, changes to the UAV, its payload, mission power requirements, or information regarding energy-harvesting sites may require the processor to review and determine mission power parameters. The mission power parameters may be received before the UAV starts moving, while traveling from one location to another, after coming to a stop but before a subsequent movement, or other suitable time.

In determination block 820, the processor may determine whether the UAV has sufficient onboard power to meet one or more mission power parameters. In response to determining that UAV does not have sufficient onboard power (i.e., determination block 820="No"), the processor may determine a best available option by weighing conventional refueling/recharging, energy harvesting, and/or mission abort options, in block 830. The processor may use a hierarchy for determining a best available option.

In determination block 835, the processor may determine whether energy harvesting has been elected over potential other options like conventional refueling or aborting one or more missions. The determination whether to elect energy harvesting may be based on the best available option. In this way, if energy harvesting is not the best available option, energy harvesting may not be elected (i.e., determination block 835="No"), the UAV may seek conventional refueling or a mission abort, in block 840.

If energy harvesting is the best available option, energy harvesting may be elected (i.e., determination block 835="Yes"), the processor may access energy-harvesting data, in block 850. For example, in block 850, the processor may access energy-harvesting data from the onboard memory (e.g., 161), perform a real-time site survey to collect and compile energy-harvesting data, request such data from a remote server (e.g., 900) or a remote communication device (e.g., 400), and/or request energy-harvesting data from another UAV (e.g., 60). In this way, energy-harvesting data may be accessed from an onboard and/or remote data source. Also, accessing energy-harvesting data may include a passive process in which information is received without prompting or an active process in which the processor makes a request or query for energy-harvesting data.

In block 860, the processor may assess a suitability of one or more sites for stationary energy harvesting. For example, the processor may determine whether current mission power parameters of one or more missions may be satisfied using available onboard power and/or energy harvested from one or more available energy-harvesting sites based on the energy-harvesting data accessed in block 850. The processor may use a preprogrammed assessment technique, which may include an inference engine that combines, fuses, and/or weighs relevant data (e.g., real-time, non-real time, or a combination thereof) for making the assessment. In various embodiments, the inference engine may combine or fuse real-time and/or non-real time data associated with the mission power parameter(s) and/or the energy-harvesting data in order to assess a suitability of one or more sites. Based on the assessment, the processor may select the best available option, when more than one option is available. Thus, the processor may not only use information associated with temporal parameters, environment, risk, and the potential for energy harvesting, but also consider the availability of information and the credibility of information available in assessing the suitability of one or more sites for stationary energy harvesting.

In assessing the suitability of energy-harvesting sites, the processor may consider mission temporal parameters, such as a deadline to reach a destination, the time or energy expenditure to reach an energy-harvesting site, or time restrictions in using an energy-harvesting site. In this way, the processor may determine whether an amount of time needed to reach and/or harvest energy at an energy-harvesting site meets mission temporal parameters as part of assessing the suitability of one or more energy-harvesting sites. Determinations regarding the amount of time needed to harvest energy at an energy-harvesting site may be based on energy harvesting rates determined from sensors onboard the UAV as part of a site survey or from a remote input (e.g., from a server, another UAV, or a sensor at the energy-harvesting site). For example, a visual image of an energy-harvesting site obtained by the UAV or from a remote input may be included as part of energy-harvesting data, which may be analyzed for assessing the suitability of the energy-harvesting site.

In addition to remote input from one or more sensors already located at an energy-harvesting site, the UAV may include one or more deployable devices that include a sensor that may communicate energy-harvesting data back to the UAV. Such deployable devices may be retrieved by the UAV after being deployed, disposable, or intended to remain at the energy-harvesting site. Also, energy-harvesting data compiled from a prior UAV visit to one or more sites may be analyzed for assessing the suitability of the energy-harvesting site. Further, assessing the suitability of an energy-harvesting site may include determining whether at least one other UAV is currently located at an energy-harvesting site of the energy-harvesting sites. The presence of one or more other UAVs currently located at an energy-harvesting site, may reflect that a site has good potential for harvesting energy. However, too many UAVs at an energy-harvesting site may mean the energy-harvesting site is too crowded for any additional UAVs to use.

In addition or alternatively, the processor may determine from the energy-harvesting data at least one environmental characteristic of energy-harvesting sites such as (but not limited to) a sunlight level, a sunlight duration, a shade movement pattern, a wind level, a wind duration, a precipitation level, a precipitation duration, a level of shelter from hostile environments, and/or the like. Such environmental characteristics may be current and/or predictive values. In addition, environmental characteristics such as shade may come from nearby objects, as well as environmental conditions such as clouds or an overcast sky.

Similarly, in assessing the suitability of energy-harvesting sites the processor may determine a level of at least one site risk selected from a group consisting of a disturbance likelihood, an ability of the UAV to remain stable at the first site, an availability of reliable fixation elements at the first site, an irretrievability of the UAV from the first site, a success rate of prior UAV visits to the first site, and/or the like. Further, the processor may consider whether local, regional, or other applicable laws, rules, and/or regulations prohibit or restrict UAVs from entering, passing through, and/or using a site, which may be considered in assessing the suitability of one or more energy-harvesting sites.

Further, the processor may determine from the energy-harvesting data whether the energy-harvesting data indicates that one or more energy-harvesting sites meet an energy production threshold suitable for the UAV to achieve the mission power parameters. An energy production threshold may be defined by an amount of energy production over a period, a rate of energy production, or a set amount of energy production. The energy production threshold may be determined from a statistical error analysis. In addition, in assessing the suitability of energy-harvesting sites, the processor may determine whether an energy harvesting potential of an energy-harvesting site, offset by an energy expenditure associated with completing a course deviation to that energy-harvesting site, is suitable for the UAV to achieve or more likely achieve the mission power parameters. Thus, while a particular energy-harvesting site may have great potential for harvesting energy, if the time or the energy expenditure associated with getting to that site is too high, the site may not be considered suitable. However, even when the time or the energy expenditure associated with getting to an energy-harvesting site is low, if the energy harvesting potential of that site is not high enough, the energy-harvesting site may not be considered suitable.

The UAV 50 may also use preferences or predicted variables that influence the assessment of the energy-harvesting sites for suitability. For example, the UAV 50 may be programmed with a preference for sites that do not require movement (e.g., to avoid shade during part of a day) or have a certain level of security. Additionally, at certain sites wind velocities may be highest at one time (e.g., afternoon) or lowest at another time (e.g., at night). The wind may be generated by weather and/or man-made elements (e.g., a heating, ventilating, and air conditioning (HVAC) unit or moving vehicles/objects nearby), which may be predicted or measured in real-time. For example, a particular time of day may be associated with low/no wind conditions or high-flow/wind conditions from the operation of an HVAC unit, vehicles passing by that generate wind, or natural wind sources.

In determination block 865, the processor may determine whether at least one energy-harvesting site is suitable for stationary energy harvesting in accordance with mission power parameters. In response to determining at least one energy-harvesting site is suitable (i.e., determination block 865="Yes"), the processor may adjust the initial or current course of the UAV to travel to the selected energy-harvesting site, in block 870. For example, the processor may direct the UAV toward at least one energy-harvesting site determined to be suitable for stationary energy harvesting. In block 873, the processor may direct the UAV 50 to autonomously park at the selected energy-harvesting site and conduct energy harvesting until sufficient power is stored to meet one or more mission power requirements.

In response to determining that UAV has sufficient onboard power (i.e., determination block 820="Yes"), in response to determining that no sites are suitable (i.e., determination block 865="No"), after performing energy harvesting in block 873, or in response to seeking conventional refueling or a mission abort in block 840, the processor may determine whether an additional power determination needs to be made, in determination block 875. Additional power determinations may be made continuously, at regular intervals, or in response to changes in conditions. Otherwise, if an additional power determination is immediately determined to be needed (i.e., determination block 875="Yes") the processor may repeat the operations of the method 800, in block 810. If no additional power determinations need to be made (i.e., determination block 875="No"), such as upon completion of a mission, the method 800 may end, in block 880. However, the method 800 may later be initiated and repeated in block 810 when mission power parameters need to be reassessed.

Various forms of computing devices may be used to communicate with a processor of a UAV, including personal computers, mobile computing devices (e.g., smartphones, etc.), servers, laptop computers, etc., to implement the various embodiments including the embodiments described with reference to FIGS. 1-8. Such computing devices may typically include, at least, the components illustrated in FIG. 9, which illustrates an example server computing device, server 900. With reference to FIGS. 1-9, the server 900 may typically include a processor 901 coupled to volatile memory 902 and a large capacity nonvolatile memory, such as a disk drive 903. The server 900 may also include a floppy disc drive, compact disc (CD) or digital video disc (DVD) drive 906 coupled to the processor 901. The server 900 may also include network access ports 904 (or interfaces) coupled to the processor 901 for establishing data connections with a network, such as the Internet and/or a local area network coupled to other system computers and servers.

Similarly, the server 900 may include additional access ports, such as USB, Firewire, Thunderbolt, and the like for coupling to peripherals, external memory, or other devices.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for managing an unmanned autonomous vehicle (UAV), comprising:
   determining, in a processor, mission power parameters for the UAV;
   accessing energy-harvesting data with the processor;
   assessing, in the processor, a suitability of an energy-harvesting site for stationary energy harvesting by the UAV based on the mission power parameters and the energy-harvesting data; and
   adjusting, by the processor, an initial course of the UAV based on the assessing of the suitability of the energy-harvesting site.

2. The method of claim 1, wherein the stationary energy harvesting includes a process performed by the UAV that derives energy by conversion from an external power source while in a fixed position in contact with an adjacent object.

3. The method of claim 2, wherein the external power source includes wind energy.

4. The method of claim 2, wherein the external power source includes solar power.

5. The method of claim 1, wherein assessing the suitability of the energy-harvesting site comprises:
   determining whether the energy-harvesting data indicates that the energy-harvesting site meets an energy production threshold suitable for the UAV to achieve the mission power parameters.

6. The method of claim 1, wherein assessing the suitability of the energy-harvesting site comprises:
   determining whether an energy harvesting potential of the energy-harvesting site, offset by an energy expenditure associated with completing a course deviation to the energy-harvesting site, is suitable for the UAV to achieve the mission power parameters.

7. The method of claim 1, wherein assessing the suitability of the energy-harvesting site comprises:
   determining whether an amount of time needed to harvest energy at the energy-harvesting site meets mission temporal parameters.

8. The method of claim 1, wherein assessing the suitability of the energy-harvesting site for the stationary energy harvesting by the UAV includes determining from the energy-harvesting data at least one environmental characteristic of the energy-harvesting site selected from a group consisting of a sunlight level, a sunlight duration, a shade movement pattern, a wind level, a wind duration, a precipitation level, a precipitation duration, and a level of shelter from hostile environments.

9. The method of claim 1, wherein assessing the suitability of the energy-harvesting site for the stationary energy harvesting by the UAV includes determining a level of at least one site risk selected from a group consisting of a disturbance likelihood, an ability of the UAV to remain stable at the energy-harvesting site, an availability of reliable fixation elements at the energy-harvesting site, an irretrievability of the UAV from the energy-harvesting site, and a success rate of prior UAV visits to the energy-harvesting site.

10. The method of claim 1, wherein assessing the suitability of the energy-harvesting site for the stationary energy harvesting by the UAV includes analyzing real-time data related to the energy-harvesting site obtained by a sensor.

11. The method of claim 1, wherein assessing the suitability of the energy-harvesting site for the stationary energy harvesting by the UAV includes analyzing information from a prior UAV visit to one or more sites.

12. The method of claim 1, wherein assessing the suitability of the energy-harvesting site for the stationary energy harvesting by the UAV includes determining whether at least one other UAV is currently located at the energy-harvesting site.

13. The method of claim 1, further comprising:
   selecting the energy-harvesting site from a plurality of energy-harvesting sites;
   wherein adjusting the initial course of the UAV includes adjusting a travel plan of the UAV to travel to the selected energy-harvesting site.

14. The method of claim 13, further comprising:
   parking at the energy-harvesting site selected for the stationary energy harvesting prior to reaching a destination of the initial course of the UAV.

15. The method of claim 1, further comprising:
   changing a position of the UAV while performing the stationary energy harvesting at the energy-harvesting site.

16. The method of claim 1, further comprising:
   changing an orientation of the UAV while performing the stationary energy harvesting at the energy-harvesting site.

17. The method of claim 1, further comprising:
   changing a component configuration of the UAV for stabilizing the UAV during the stationary energy harvesting at the energy-harvesting site.

18. The method of claim 1, further comprising:
   accessing, by the processor, a parameter update to the mission power parameters for the UAV; and
   reassessing, by the processor, the suitability of the energy-harvesting site for the stationary energy harvesting by the UAV based on the parameter update to the mission power parameters.

19. The method of claim 1, further comprising:
   activating a sensor for generating an energy-harvesting update in response to reaching the energy-harvesting site; and
   reassessing the suitability of the energy-harvesting site for the stationary energy harvesting by the UAV based on the energy-harvesting update.

20. The method of claim 1, further comprising:
accessing, with the processor, an energy-harvesting update to the energy-harvesting data; and
reassessing, with the processor, the suitability of the energy-harvesting site for the stationary energy harvesting by the UAV based on the energy-harvesting update.

21. The method of claim 1, further comprising:
determining, in the processor, whether an available onboard power level meets the mission power parameters;
wherein the mission power parameters indicate a projected power requirement and a power reserve threshold for a mission; and
wherein accessing the energy-harvesting data is performed in response to determining that the available onboard power level does not meet the mission power parameters.

22. The method of claim 1, wherein determining mission power parameters includes determining whether the stationary energy harvesting is not permissible due to a perishable nature of a payload or the payload has too high a value.

23. An unmanned autonomous vehicle (UAV), comprising:
a memory;
an energy-harvesting component; and
a processor coupled to the memory and the energy-harvesting component and configured with processor-executable instructions to:
determine mission power parameters for the UAV;
access energy-harvesting data;
assess a suitability of an energy-harvesting site for stationary energy harvesting using the energy-harvesting component based on the mission power parameters and the energy-harvesting data; and
adjust an initial course of the UAV based on the suitability of the energy-harvesting site.

24. The UAV of claim 23, wherein the processor is further configured with the processor-executable instructions to assess the suitability of the energy-harvesting site by determining whether the energy-harvesting data indicates that the energy-harvesting site meets an energy production threshold suitable for the UAV to achieve the mission power parameters.

25. The UAV of claim 23, wherein the processor is further configured with the processor-executable instructions to assess the suitability of the energy-harvesting site by determining whether an energy harvesting potential of the energy-harvesting site, offset by an energy expenditure associated with completing a course deviation to the energy-harvesting site, is suitable for the UAV to achieve the mission power parameters.

26. The UAV of claim 23, wherein the processor is further configured with the processor-executable instructions to assess the suitability of the energy-harvesting site by determining whether an amount of time needed to harvest energy at the energy-harvesting site meets mission temporal parameters.

27. The UAV of claim 23, wherein the processor is further configured with the processor-executable instructions to assess the suitability of the energy-harvesting site for the stationary energy harvesting by the UAV by analyzing information from a prior UAV visit to one or more sites.

28. The UAV of claim 23, further comprising a sensor coupled to the processor, wherein the processor is further configured with the processor-executable instructions to assess the suitability of the energy-harvesting site for the stationary energy harvesting by analyzing real-time data related to the energy-harvesting site obtained by the sensor.

29. An unmanned autonomous vehicle (UAV), comprising:
means for determining mission power parameters for the UAV;
means for accessing energy-harvesting data;
means for assessing a suitability of an energy-harvesting site for stationary energy harvesting by the UAV based on the mission power parameters and the energy-harvesting data; and
means for adjusting an initial course of the UAV based on the assessing of the suitability of the energy-harvesting site.

30. A non-transitory processor-readable storage medium having stored thereon processor-executable instructions configured to cause a processor of an unmanned autonomous vehicle (UAV) to perform operations comprising:
determining mission power parameters for the UAV;
accessing energy-harvesting data;
assessing a suitability of an energy-harvesting site for stationary energy harvesting by the UAV based on the mission power parameters and the energy-harvesting data; and
adjusting an initial course of the UAV based on the assessing of the suitability of the energy-harvesting site.

* * * * *